United States Patent [19]
Hertz et al.

[11] 3,988,740
[45] Oct. 26, 1976

[54] APPARATUS FOR DEPOSITING LIQUID DROPLETS ON A MOVING RECEIVING SURFACE

[75] Inventors: Helmuth Hertz, Lund, Sweden; Rudolf Meyer, Leverkusen, Germany

[73] Assignee: AGFA-Gevaert, A.G., Leverkusen, Germany

[22] Filed: Sept. 25, 1972

[21] Appl. No.: 292,190

[30] Foreign Application Priority Data
Sept. 25, 1971 Germany............................ 2147934

[52] U.S. Cl. ................................................. 346/75
[51] Int. Cl.² ........................................ G01D 15/16
[58] Field of Search ............................. 346/75, 140

[56] References Cited
UNITED STATES PATENTS

| | | | |
|---|---|---|---|
| 2,925,312 | 2/1960 | Hollmann ...................... | 346/75 X |
| 3,267,481 | 8/1966 | Bauer et al. .................. | 346/75 X |
| 3,363,545 | 1/1968 | Johnson et al. .................. | 101/1 |
| 3,673,601 | 6/1972 | Hertz ................................ | 346/75 |

*Primary Examiner*—Joseph W. Hartary
*Attorney, Agent, or Firm*—Michael J. Striker

[57] ABSTRACT

Apparatus for depositing liquid droplets in a printing operation employs a member having a receiving surface and being moved at a speed high enough to cause the generation of a gaseous boundary layer along the receiving surface. The stream of droplets is projected at right angles to the rapidly moving receiving surface and a stationary intercepting device is provided to remove, deflect or slow down the boundary layer upstream of the locus where the droplets impinge upon the receiving surface. If the receiving surface is provided on a cylindrical member, the intercepting means may comprise a stationary cylinder surrounding the receiving surface with a clearance of 0.5–2 millimeters. Regardless of the configuration of the receiving surface, the intercepting means may employ one or more stationary deflecting blades or one or more suction nozzles having orifices closely adjacent to the receiving surface immediately upstream of the locus of impingement of droplets.

8 Claims, 3 Drawing Figures

3,988,740

APPARATUS FOR DEPOSITING LIQUID DROPLETS ON A MOVING RECEIVING SURFACE

BACKGROUND OF THE INVENTION

The present invention relates to apparatus for depositing liquid droplets on a moving receiving surface, and more particularly to improvements in apparatus which can form part of image construction systems using multiple arrays of drop generators. For example, the apparatus of the present invention may be utilized to create a pattern or image as in a printing operation.

U.S. Pat. No. 3,560,988 to Krick discloses an apparatus for high-speed precision placement of liquid droplets on a movable member, e.g., a web of paper having a receiving surface for droplets. The apparatus comprises a device for projecting drops onto the receiving surface at an angle other than 90° in order to impart to the drops a substantial velocity component in the direction of relative movement between the drop generator and the receivng surface. The purpose of such inclination of the direction of drop travel relative to the direction of travel of the receiving surface is to reduce the velocity of relative movement between the receiving surface and the drops and to thus reduce the likelihood of smearing or distortion of drops on impact against the receiving surface.

Problems arise when the member is moved at such a speed that a gaseous boundary layer develops along the receiving surface. The droplets must penetrate through the boundary layer and are thereby deflected and deformed so that they produce on the receiving surface dots of blurred non-circular outline. The propulsion of drops at an acute angle to the direction of travel of the member is of no help because the drops invariably produce marks of oval outline.

SUMMARY OF THE INVENTION

An object of the invention is to provide a drop depositing apparatus which is capable of forming on the moving receiving surface sharply defined dots or marks of circular outline even if the member which is provided with the receiving surface is moved at a speed at which it causes the generation of a pronounced gaseous boundary layer adjacent to and moving with the receiving surface.

Another object of the invention is to provide an apparatus which is constructed and assembled in such a way that it prevents the boundary layer from influencing the quality of marks which are formed by liquid droplets on a rapidly moving receiving surface.

A further object of the invention is to provide an apparatus wherein the liquid droplets invariably reach the rapidly moving receiving surface at a predetermined locus.

An additional object of the invention is to provide the apparatus with novel and improved means for removing or intercepting or weakening the influence of the boundary layer in the region where the path of liquid droplets intersects the path of the receiving surface.

The improved apparatus is used to deposit liquid droplets on a member having a receiving surface and moving in a predetermined direction (e.g., along an arcuate path) at a speed which is sufficiently high to form a gaseous boundary layer adjacent to and moving with the receiving surface in the predetermined direction. The apparatus comprises a liquid supplying device having at least one orifice arranged to discharge a stream of droplets against the moving surface, preferably in such a way that the stream of droplets is normal to the plane of the moving surface at the locus where the droplets impinge on the surface, and intercepting means which is located upstream of the aforementioned locus of impingement of the stream against the moving surface, as considered in the direction of movement of the surface, to at least partially remove the boundary layer in the region of the locus of impingement.

The intercepting means may comprise a stationary blade which extends into close proximity of the moving surface and at least a portion of which preferably makes an acute angle with the direction of movement of the surface. Alternatively, the intercepting means may comprise at least one suction nozzle having at least one inlet opening positioned to collect the gaseous boundary layer upstream of the locus of impingement of the stream against the surface. It is also within the purview of the invention to construct the intercepting means in the form of a stationary braking device having a surface which is closely adjacent to the boundary layer and which may be serrated, ribbed, toothed or otherwise roughened to produce a pronounced braking action.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
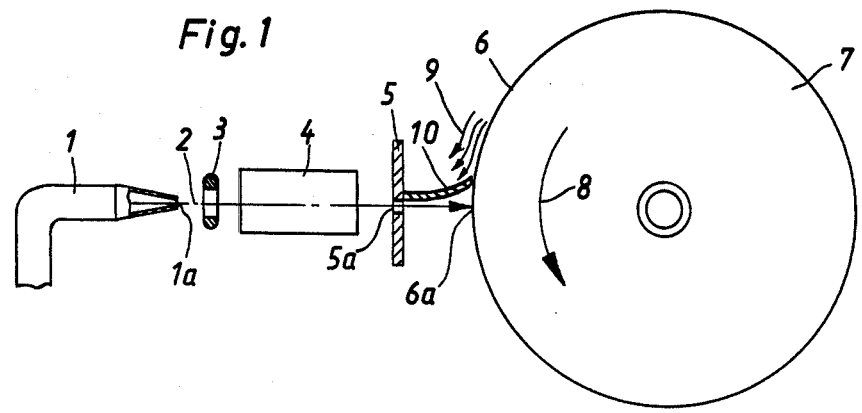
FIG. 1 is a fragmentary partly elevational and partly sectional view of an apparatus which embodies one form of the invention and wherein the intercepting means for the boundary layer comprises a stationary blade.

Referring first to FIG. 1, there is shown an apparatus for depositing liquid droplets on a member 7 having a cylindrical receiving surface 6. The member 7 is a roller which is rotated in the direction indicated by arrow 8 at a speed which is sufficiently high to generate a gaseous boundary layer (see the arrows 9). The boundary layer travels with the receiving surface 6. The liquid supplying or projectng device of the apparatus comprises a nozzle 1 having an orifice 1a serving to discharge a liquid stream 2 at right angles to the direction of travel of the receiving surface 6, i.e., radially of the member 7. The liquid stream 2 is modulated in a known manner not forming part of the present invention by modulating means including the parts 3 and 4 and passes through the opening 5a of a stationary diaphragm 5 to impinge upon the surface 6 at a locus 6a.

In the embodiment of FIG. 1, the intercepting means for the boundary layer comprises a stationary blade 10 which extends into close proximity of the surface 6 upstream of the locus 6a of impingement of liquid droplets against the surface 6, as considered in the direction of the arrow 8, and serves to deflect or peel off the boundary layer so that the gaseous material of such layer cannot influence the droplets of the stream 2 when the droplets impinge on the rapidly moving surface 6. This insures the formation of sharply defined dots of circular outline. At least that portion of the blade 10 which is immediately adjacent to the surface 6 makes an acute angle with the direction of travel of the member 7 so as to reduce the likelihood of turbulence. The blade 10 can be mounted in such a way that its gas-deflecting edge is closely adjacent to the locus 6a. The distance between the edge of the blade 10 and the surface 6 is sufficiently small to insure the interception of the entire boundary layer or at least of the major part of such boundary layer.

Figure 2:
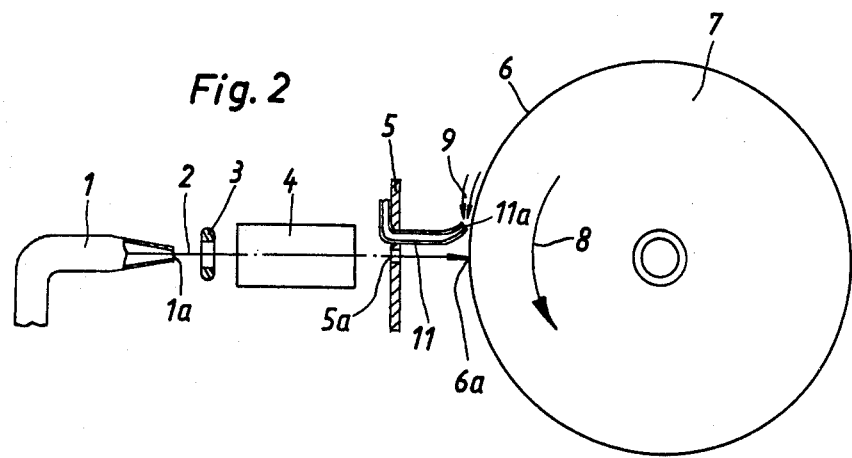
FIG. 2 is a similar fragmentary partly elevational and partly sectional view of a second apparatus wherein the intercepting means comprises a suction nozzle.

FIG. 2 illustrates a portion of a second apparatus wherein all such parts which are identical with or clearly analogous to the corresponding parts of the apparatus shown in FIG. 1 are denoted by similar reference characters. The blade-like intercepting means 10 is replaced with at least one suction nozzle 11 having an inlet opening 11a and being connected to a fan (not shown) or another suitable suction generating device so that it draws the gaseous material of the boundary layer (arrows 9) upstream of the locus 6a where the stream 2 of droplets impinges upon the receiving surface 6. The nozzle 11 may constitute one of a battery of two or more nozzles having their inlet openings 11a positioned in such a way that they invariably remove the boundary layer from those increments of the surface 6 which are about to move across the path of the stream 2.

Figure 3:
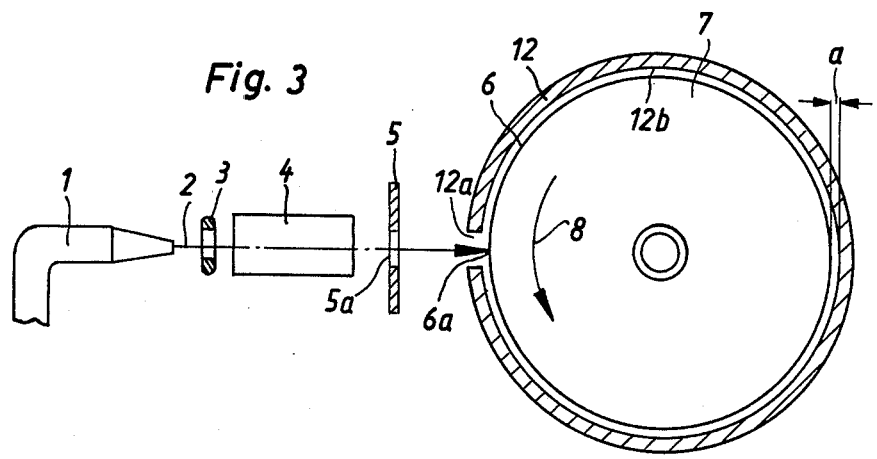
FIG. 3 is a fragmentary partly elevational and partly sectional view of a third apparatus wherein the intercepting means comprises a stationary braking cylinder.

Referring to FIG. 3, there is shown a portion of a further apparatus wherein the blade 10 or the suction nozzle 11 is replaced by intercepting means in the form of a stationary braking cylinder 12 surrounding the rapidly moving receiving surface 6 of the drum-shaped member 7 with a small clearance a and having an opening or window 12a for the stream 2 of liquid droplets which impinge upon the surface 6 at the locus 6a. The distance a between the surface 6 and the surface 12b of the cylinder 12 may be in the range of 0.5–2 millimeters. Experiments have shown that a clearance of such width suffices to insure a highly satisfactory braking action upon the boundary layer so that the latter cannot adversely influence the droplets of the stream 2 at the locus 6a.

It is clear that the improved apparatus is susceptible of many additional modifications without departing from the spirit of the invention. For example, the concave surface of the blade 10 or the internal surface 12b of the cylindrical braking element 12 can be roughened by providing such surface with teeth, ribs, prongs or other protuberances to further enhance the braking or intercepting action. Moreover, the blade 10 can be replaced with an intercepting element of arcuate shape which partially surrounds the stream 2 in the region of the locus 6a, and the nozzle 1 can be replaced with a nozzle which defines a spiral passage for the liquid stream. Such construction of the blade 10 and/or nozzle 1 reduces the likelihood of marginal turbulences. Furthermore, the receiving surface 6 may be a flat surface (refer to the U.S. Pat. No. 3,560,988); the apparatus then preferably employs intercepting means of the type shown in FIG. 1 or 2.

It was found that the extremely simple intercepting means of FIG. 1, 2 or 3 is capable of effectively reducing or eliminating the influence of the boundary layer upon the droplets of the stream 2. Thus, the intercepting means either completely removes or at least deflects or reduces the speed of the gaseous boundary layer to such an extent that the boundary layer is incapable of exerting an adverse aerodynamic influence (deflection) upon the liquid stream. The stream 2 can be directed at right angles to the travelling receiving surface 6 to insure the formation of clearly defined dots or marks having a circular outline.

The manner in which the spacing of droplets is controlled by electrostatic charging and switching controls is known and, therefore, the details of such controls are not shown in the drawing.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for depositing liquid droplets on a member having a receiving surface and moving rapidly in a first direction, along a predetermined path, and at a speed sufficiently high to form a pronounced gaseous boundary layer which is adjacent to and moves with said receiving surface in said first direction, comprising a liquid supplying device having an orifice arranged to discharge against said receiving surface a stream of droplets in a second direction so that, in the absence of deflection of said stream, said droplets invariably impinge against said receiving surface at a locus constituting a predetermined portion of said path; and intercepting means adjacent to said path and located upstream of and in register with said locus, as considered in said first direction, to at least partially remove said boundary layer from those portions of said receiving surface which are about to enter said predetermined portion of said path so that the boundary layer is incapable of exerting an adverse aerodynamic infuence upon said stream and the droplets of said stream continue to travel in said second direction all the way to the point of contact with said receiving surface, said intercepting means comprising a stationary blade extending into close proximity of said surface.

2. Apparatus as defined in claim 1, wherein at least a portion of said blade makes an acute angle with said direction of movement of said member.

3. Apparatus as defined in claim 1, wherein said receiving surface is a cylindrical surface and said orifice is arranged to discharge said stream radially of said cylindrical surface.

4. Apparatus as defined in claim 1, further comprising means for modulating said stream between said orifice and said locus.

5. Apparatus as defined in claim 1, wherein said direction makes a right angle with said first direction.

6. Apparatus for depositing liquid droplets on a member having a receiving surface and moving rapidly in a first direction, along a predetermined path, and at a speed sufficiently high to form a pronounced gaseous boundary layer which is adjacent to and moves with said receiving surface in said first direction, comprising a liquid supplying device having an orifice arranged to discharge against said receiving surface a stream of droplets in a second direction so that, in the absence of deflection of said stream, said droplets invariably impinge against said receiving surface at a locus constituting a predetermined portion of said path; and intercepting means adjacent to said path and located upstream of and in register with said locus, as considered in said first direction, to at least partially remove said boundary layer from those portions of said receiving surface which are about to enter said predetermined portion of said path so that the boundary layer is incapable of exerting an adverse aerodynamic influence upon said stream and the droplets of said stream continue to travel in said second direction all the way to the point of contact with said receiving surface, said intercepting means comprising a stationary braking device having a surface closely adjacent to said boundary layer.

7. Apparatus as defined in claim 6, wherein the surface of said braking device is roughened.

8. Apparatus for depositing liquid droplets on a member having a cylindrical receiving surface and moving rapidly in a first direction, along a predetermined path, and at a speed sufficiently high to form a pronounced gaseous boundary layer which is adjacent to and moves with said receiving surface in said first direction, comprising a liquid supplying device having an orifice arranged to discharge against said receiving surface a stream of droplets in a second direction so that, in the absence of deflection of said stream, said droplets invariably impinge against said receiving surface at a locus constituting a predetermined portion of said path; and intercepting means adjacent to said path and located upstream of and in register with said locus, as considered in said first direction, to at least partially remove said boundary layer from those portions of said receiving surface which are about to enter said predetermined portion of said path so that the boundary layer is incapable of exerting an adverse aerodynamic influence upon said stream and the droplets of said stream continue to travel in said second direction all the way to the point of contact with said receiving surface, said intercepting means being a hollow stationary cylinder surrounding said cylindrical surface and having an internal cylindrical surface located sufficiently close to said receiving surface to brake said boundary layer, said stationary cylinder having opening means through which said stream passes to impinge against said receiving surface.

* * * * *